United States Patent
Nitze-Nelson et al.

(10) Patent No.: US 11,254,212 B2
(45) Date of Patent: Feb. 22, 2022

(54) SHIFTING A ROAD VIEW BASED ON A SPEED FOR A VEHICLE

(71) Applicant: BYTON NORTH AMERICA CORPORATION, Santa Clara, CA (US)

(72) Inventors: Andre Nitze-Nelson, Pipes Canyon, CA (US); Carsten Kuhoff, Sunnyvale, CA (US)

(73) Assignee: Byton North America Corporation, Santa Clara, CA (US)

( * ) Notice: Subject to any disclaimer, the term of this patent is extended or adjusted under 35 U.S.C. 154(b) by 0 days.

(21) Appl. No.: 16/564,634

(22) Filed: Sep. 9, 2019

(65) Prior Publication Data
US 2021/0070177 A1 Mar. 11, 2021

(51) Int. Cl.
*G08B 21/00* (2006.01)
*B60K 37/02* (2006.01)
(Continued)

(52) U.S. Cl.
CPC ........... *B60K 37/02* (2013.01); *B60R 1/00* (2013.01); *G06K 9/00791* (2013.01);
(Continued)

(58) Field of Classification Search
CPC .......... B60R 1/00; B60R 2300/105; B60R 2300/607; B60R 2300/303; B60R 2300/806; B60R 1/12; B60R 2001/1215; B60R 2001/1253; B60R 2300/302; B60R 2300/605; B60R 2300/301; B60R 11/04; B60R 1/002; B60R 2300/102; B60R 2300/205; B60R 2300/304; B60R 2300/305; B60R 2300/307; B60R 2300/802; B60R 2300/8026; B60R 2300/8093; B60W 10/04; B60W 10/18;
(Continued)

(56) References Cited

U.S. PATENT DOCUMENTS

| | | | | |
|---|---|---|---|---|
| 5,410,484 A | * | 4/1995 | Kunimi | B60T 7/22 180/170 |
| 5,717,390 A | * | 2/1998 | Hasselbring | G01S 13/865 340/933 |

(Continued)

OTHER PUBLICATIONS

Howard, Bill, "What are car surround view cameras, and why are they better than they need to be?," <https://www.extremetech.com/extreme/186160-what-are-surround-view-cameras-and-why-are-they-better-than-they-need-to-be>, Jul. 18, 2014, 7 pages.

*Primary Examiner* — Daniel Previl
(74) *Attorney, Agent, or Firm* — Womble Bond Dickinson (US) LLP

(57) ABSTRACT

Embodiments are disclosed for shifting a road view of a display for a vehicle. For one embodiment, a system determines a vehicle has come to a standstill. Upon determining that the vehicle has come to a standstill, the system automatically shifts a display of a first view for the vehicle to a second view. The system determines the vehicle is in motion after being in a standstill. Upon determining that the vehicle is in motion after being in a standstill, the system automatically shifts a display of the second view for the vehicle back to the first view. For one embodiment, the first view includes a third-person view and the second view includes an overhead view.

25 Claims, 8 Drawing Sheets

(51) Int. Cl.
 B60R 1/00 (2022.01)
 G06K 9/00 (2022.01)
(52) U.S. Cl.
 CPC .. *B60K 2370/167* (2019.05); *B60K 2370/176* (2019.05); *B60K 2370/179* (2019.05); *B60R 2300/602* (2013.01); *B60R 2300/607* (2013.01); *B60R 2300/8093* (2013.01)
(58) Field of Classification Search
 CPC .. B60W 10/20; B60W 40/02; B60W 50/0098; B60W 2420/42; B60W 2420/52; B60W 2556/50; B60W 2710/20; B60W 2720/10; B60W 30/09; B60W 30/095; B60W 30/18163; B60W 30/182; B60W 50/087; B60W 50/12; B60W 50/14; G06K 9/00805; G06K 9/00671; G06K 9/00791; B60K 35/00; B60K 2370/1529; B60K 2370/177; B60K 2370/155; B60K 2370/191; B60K 2370/334; B60K 2370/52; B60K 2370/785; B60K 2370/178; B60K 2370/179; B60Q 9/005; G05D 1/0061; H04N 5/23293; H04N 5/247; H04N 5/74; H04N 5/268; H04N 7/18; H04N 7/181; G02B 27/01; G02B 2027/014; G02B 27/0101; G02B 2027/0112; G02B 2027/0118; G02B 2027/0138; G02B 2027/0159; G02B 2027/0183; G02B 2027/0187; G02B 2027/012; G02B 2027/0127; G02B 2027/0141; G08G 1/16; G08G 1/166; G08G 1/096855; G08G 1/165; G08G 1/168; G01S 13/86; G01S 13/87; G01S 13/931; G01S 2013/93271; G01S 2013/93272; G06T 11/001; G06T 15/205; G06T 19/006; G09F 19/18; G09F 21/04; G09G 3/002; G09G 5/10; G09F 5/373; B62D 15/027; B62D 15/0275; B62D 15/0285; E02F 9/028; E02F 9/085; E02F 9/261; E02F 9/264
 USPC .... 340/425.5, 933, 937, 901–903, 942, 905, 340/438–439, 435–436
 See application file for complete search history.

(56) References Cited

U.S. PATENT DOCUMENTS

| | | | | |
|---|---|---|---|---|
| 5,892,855 | A | * | 4/1999 | Kakinami ............ G06K 9/4633 348/119 |
| 5,901,806 | A | * | 5/1999 | Takahashi ................. B60T 7/22 180/170 |
| 6,087,987 | A | * | 7/2000 | Bachhuber .............. B60R 25/24 307/10.5 |
| 9,718,405 | B1 | * | 8/2017 | Englander .............. B60K 35/00 |
| 2006/0050018 | A1 | * | 3/2006 | Hutzel ...................... B60R 1/12 345/60 |
| 2008/0122597 | A1 | * | 5/2008 | Englander .............. B60Q 5/006 340/433 |
| 2015/0302261 | A1 | * | 10/2015 | Kiyohara .................. B60R 1/00 382/104 |
| 2016/0304028 | A1 | * | 10/2016 | Hathaway ................ G08G 1/04 |
| 2017/0050521 | A1 | * | 2/2017 | Shaw ..................... B60K 37/06 |
| 2018/0001903 | A1 | | 1/2018 | Nagy et al. |
| 2018/0298866 | A1 | * | 10/2018 | Okitsu .................... F02D 45/00 |
| 2018/0315244 | A1 | * | 11/2018 | Thompson ......... H04N 5/23293 |
| 2019/0082377 | A1 | * | 3/2019 | Silver ............. G08G 1/096741 |
| 2020/0339157 | A1 | | 10/2020 | Yurdana et al. |

\* cited by examiner

SHIFTING A ROAD VIEW BASED ON A SPEED FOR A VEHICLE

FIELD

The disclosed embodiments relate generally to vehicle systems and in particular, but not exclusively, to shifting a road view based on a speed for a vehicle.

BACKGROUND

Windshields of a vehicle can sometimes be difficult to see through. Especially when there is glare, rain, and/or an operator is operating the vehicle at night. Possible driving hazards while operating the vehicle include cars and trucks in other lanes. Possible hazards while a vehicle is parked include curbs, signs, trees, etc. An operator of the vehicle can hit a curb, a tree, or other vehicles if they are not careful. Furthermore, opening a door into a street sign, or a tree can damage the vehicle.

SUMMARY

Embodiments are disclosed for transitioning/shifting a road view of a display for a vehicle for a safe operation of the vehicle. For one embodiment, a system determines a vehicle has come to a standstill. Upon determining that the vehicle has come to a standstill, the system automatically shifts a display of a first view for the vehicle to a second view. The system determines the vehicle is in motion after being in a standstill. Upon determining that the vehicle is in motion after being in a standstill, the system automatically shifts a display of the second view for the vehicle back to the first view. For one embodiment, the first view includes a third-person view and the second view includes an overhead view.

BRIEF DESCRIPTION OF THE DRAWINGS

The appended drawings illustrate examples and, therefore, are exemplary embodiments, and not to be considered limiting in scope.

DETAILED DESCRIPTION

Figure 1:
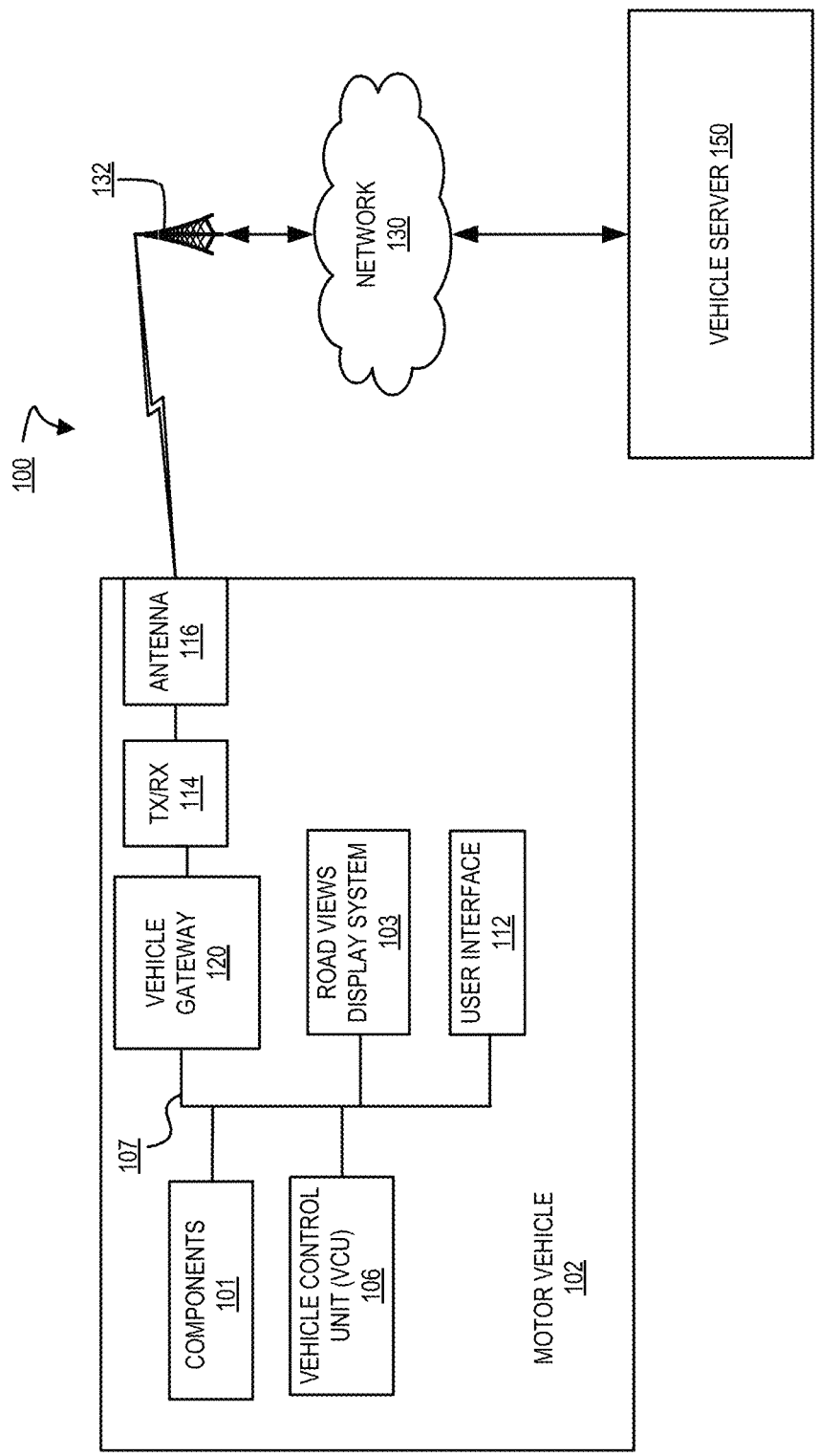
FIG. 1 is a block diagram of an exemplary system architecture for a motor vehicle and a server.

FIG. 1 is a block diagram for an example of a system architecture 100 for a motor vehicle. For some embodiments, motor vehicle 102 may a fully electric vehicle, a partially electric (i.e., hybrid) vehicle, or a non-electric vehicle (i.e., vehicle with a traditional internal combustion engine) having a display system. Furthermore, although described mostly in the context of automobiles, including sport utility vehicles (SUV), the illustrated systems and methods can also be used in other wheeled vehicles such as trucks, motorcycles, buses, trains, etc. It can also be used in non-wheeled vehicles such as ships and airplanes.

For one embodiment, motor vehicle 102 includes components 101, road views display system 103, vehicle control unit (VCU) 106, user interface 112, and vehicle gateway 120. Road views display system 103 can generate and display a road view for motor vehicle 102. Road views display system 103 can send the generated road view to a display (as part of user interface 112) to display the road view to an operator of vehicle 102. Road views display system can also generate other road views and shift/convert/change different road views being displayed according to a set of predetermined conditions. Some predetermined conditions include vehicle speed, road terrain, road altitude, time of day, whether the vehicle is in motion, type of vehicle, etc.

Vehicle control unit (VCU) 106 can be a controller that includes a microprocessor, memory, storage, and/or a communication interface with which it can communicate with various systems such as components 101, display system 103, and/or vehicle gateway 120 via network 107. Components 101 may be general components of vehicle 102. For example, components 101 can include accelerometer sensors, gyro sensors, speed sensors, adjustable seat actuators, power inverters, window controls, electronic braking systems, etc.

For one embodiment, road views display system 103 can communicate with VCU 106 or user interface 112 via network 107. For one embodiment VCU 106 is the vehicle's main computer, but in other embodiments it can be a component separate from the vehicle's main or primary computer. For one embodiment, vehicle gateway 120 and VCU 106 may be an integrated component. For another embodiment, road views display system 103 and VCU 106 may be an integrated component.

Communications network 107 may be a controller area network (CAN) bus, an Ethernet network, a wireless communications network, another type of communications network, or a combination of different communication networks. For one embodiment, vehicle gateway 120 is communicatively coupled to transceiver 114, which is communicatively coupled to antenna 116, through which motor vehicle 102 can wirelessly transmit data to, and receive data from, vehicle server 150. Referring to FIG. 1, motor vehicle 102 can communicate wirelessly via antenna 116 with tower 132, which can then communicate via network 130 (e.g., a cellular communication network, a local area network, a wide area network, etc.) with vehicle server 150.

Although only one motor vehicle 102 is shown, in other embodiments many more motor vehicles can be connected to vehicle server 150. Furthermore, vehicle server 150 may be comprised of two or more server computer systems distributed over network 130.

Vehicle server 150 is communicatively coupled to network 130, so that vehicle server 150 can exchange data with motor vehicle 102, as well as to exchange information with other systems. For example, motor vehicle 102 may exchange speed and planning information with vehicle server 150 and vehicle server 150 may schedule, notify, or consult with other systems, such as notifying other vehicles of a state/status of motor vehicle 102 via network 130. Although illustrated as a single server, in other embodiment's server 150 can include multiple servers, each of which includes one or more microprocessors, memory, and storage.

Figure 2:
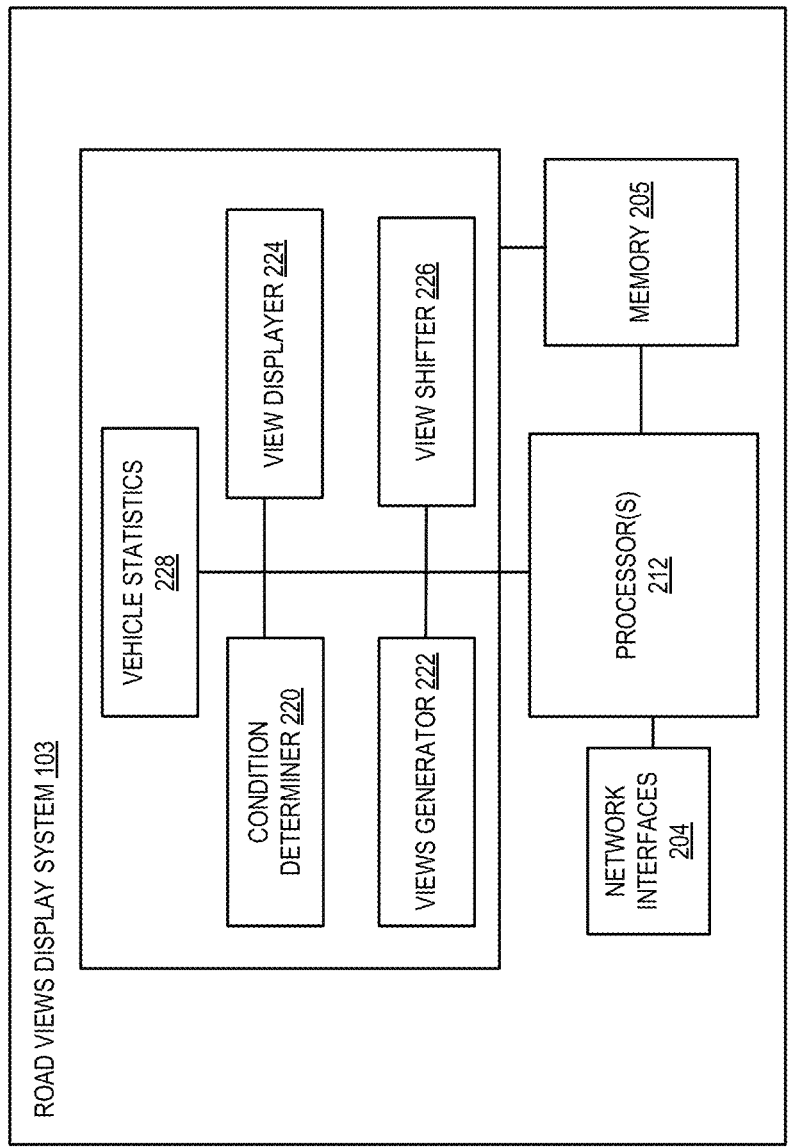
FIG. 2 is block diagram of one embodiment of a road views display system.

FIG. 2 is block diagram of an example of a road views display system according to one embodiment. Referring to FIG. 2, for one embodiment, road views display system 103 includes one or more processor(s) 212, memory 205, and network interfaces 204. Network interfaces 204 may communicatively couple motor vehicle 102 to any number of wireless subsystems (e.g., Bluetooth, WiFi, Cellular, or other networks), internal motor vehicle communication networks (e.g., a CAN bus, an Ethernet network, a wireless network, etc.) to transmit and receive data streams through one or more communication links.

Memory 205 may be coupled to processor(s) 212 to store instructions for execution by processor(s) 212. For some embodiments, memory 205 is non-transitory, and may store one or more processing modules of road views display system 103.

Road views display system 103 can generate a set of road views to be displayed to an operator of vehicle 102. System 103 can also shift/change the road views according to some predetermined conditions. For example, system 103 can display an overhead road view when the vehicle is determined to come to a stop, system 103 can display a third-person road view when the vehicle is determined to be in motion.

For one embodiment, display system 103 can include condition determiner 220, views generator 222, views displayer 224, view shifter 226, and vehicle statistics displayer 228. Condition determiner 220 can determine if one of a set of predetermined condition is met. If a predetermined condition is met, a road view being displayed can be shifted from one to another. The conditions can include, but is not limited to, a motion, a speed, an acceleration, a type of vehicle, or a combination thereof. Views generator 222 can generate one or more road views for vehicle 102. Examples of road views include overhead (bird's eye) view, first-person (perspective) view, third-person view, drone view, etc. Views displayer 224 can display one of the views on a display area (such as a dashboard display) of vehicle 102. View shifter 226 can shift a view being displayed to another view. The shifting can be gradual or abrupt. Vehicle statistics 228 can includes one or more driving/health statistics for vehicle 102 to be displayed.

Figure 3:
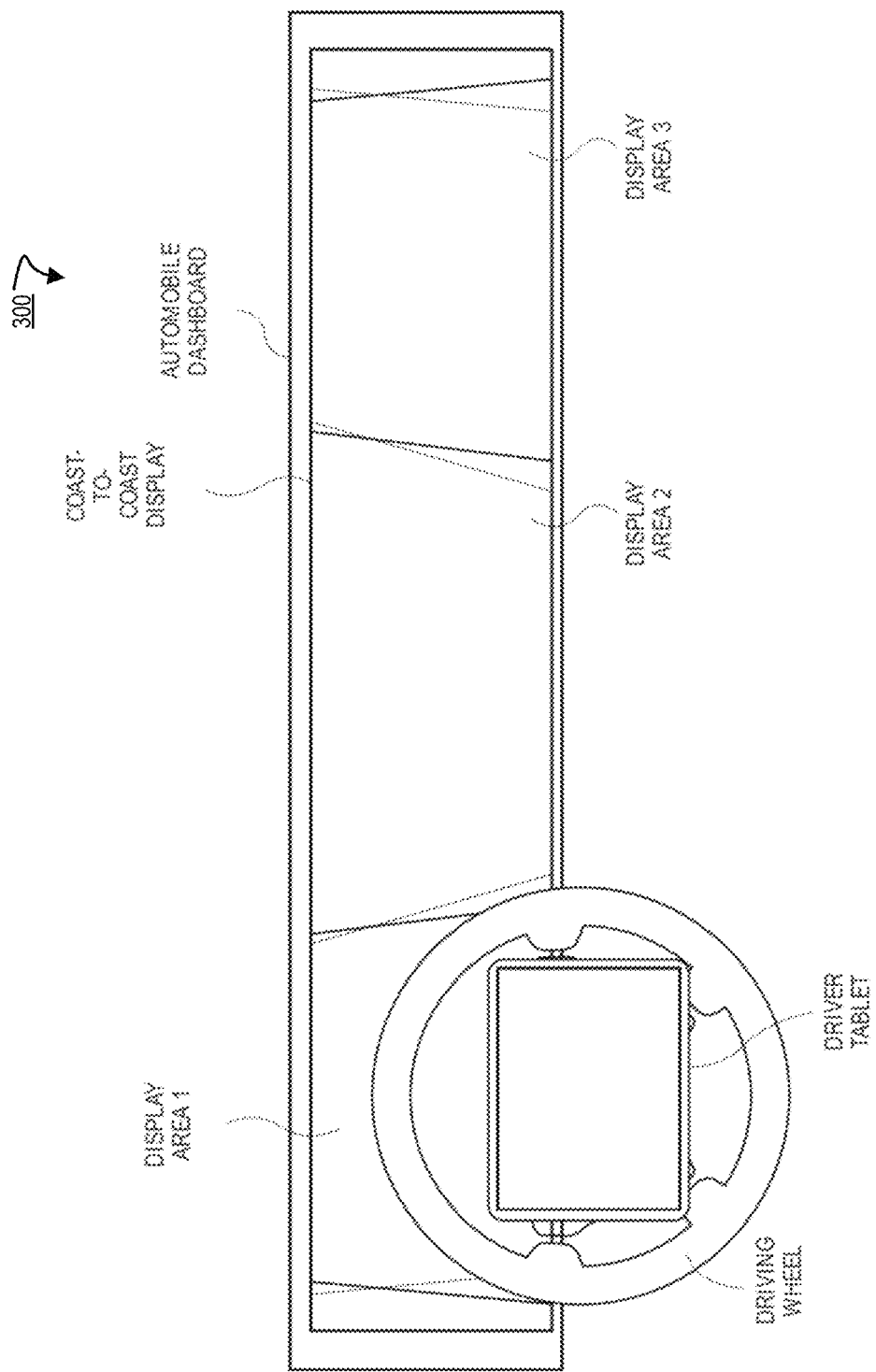
FIG. 3 is block diagram of one embodiment of a dashboard of a vehicle.

FIG. 3 is block diagram of one embodiment of a dashboard of a vehicle. Referring to FIG. 3, for one embodiment, motor vehicle 102 can include dashboard 300 with a number of display areas. The display areas can include, but not limited to, a display area on a driver tablet of a driving wheel, display area 1 directly behind the driving wheel, display area 2 in a center region of the dashboard, and/or display area 3 in a right region of the dashboard. The display areas 1-3 can be integrated into a single coast-to-coast display. Any one of the display areas can be used (as part of view displayer 224 of FIG. 2 or user interface 112 of FIG. 1) to display a road view for vehicle 102. For one embodiment, a road view can be displayed as a projection on a windshield, or a display device near the backseats for backseat passengers, or a handheld display device, etc.

Figure 4:
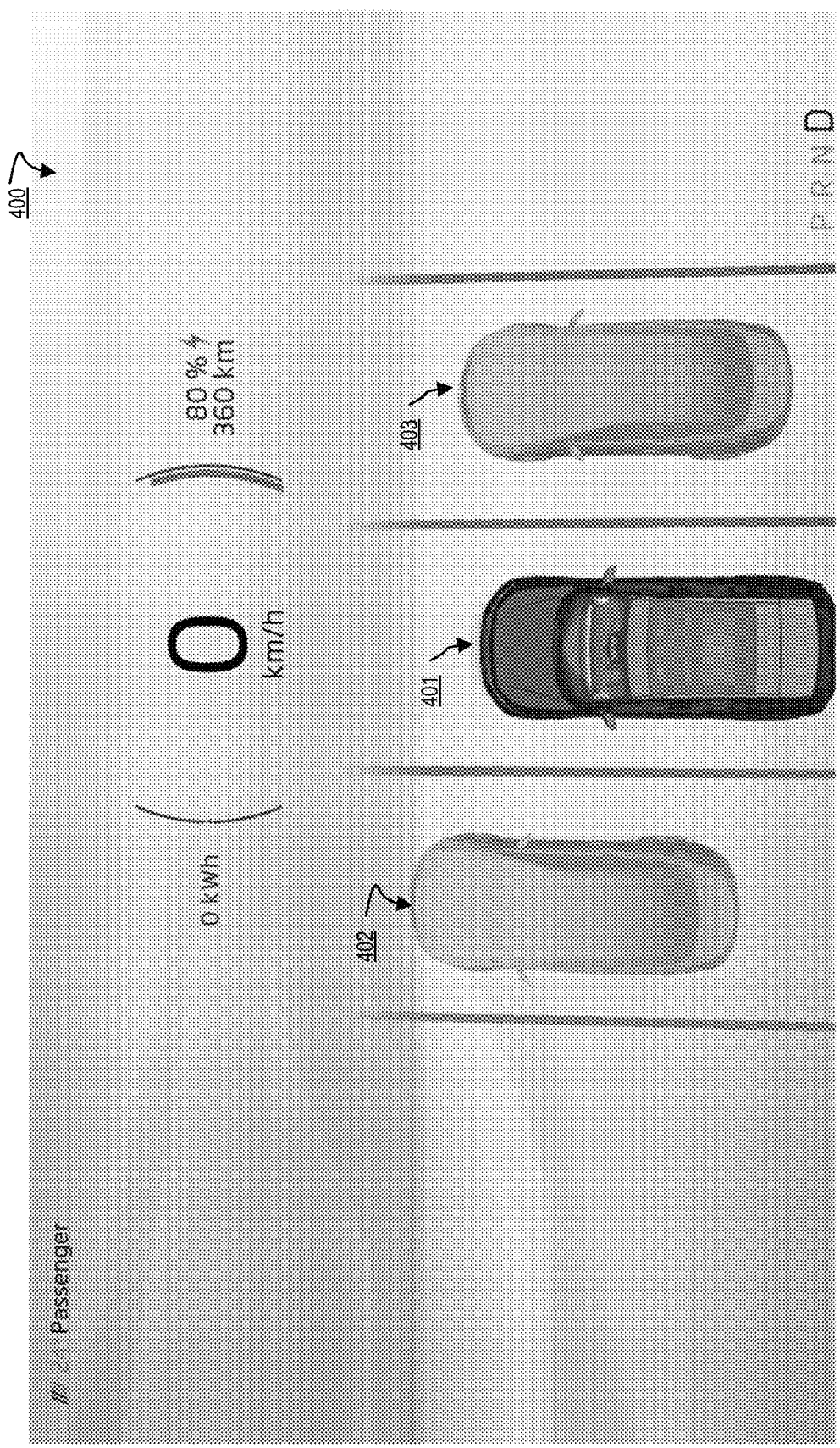
FIGS. 4-7 illustrate a number of road views according to one embodiment.
Figure 5:
Figure 6:

FIGS. 4-7 illustrate a number of road views according to one embodiment. Referring to FIGS. 4-7, road views 400, 500, 600, 700 may be displayed by a display system on any display areas (such as display areas 1-3 of FIG. 3) as described above. Referring to FIG. 4, road view 400 includes an overhead view that is directly overhead an animated vehicle 401. Animated vehicle 401 can represent vehicle 102 of FIG. 1. For one embodiment, view 400 can include a number of driving statistics, such as driving modes (park, reverse, neutral, drive), fuel/battery capacity indicator, battery range indicator, speed indicator, energy output indicator, cellular network status indicator, and outdoor temperature for vehicle 102.

For one embodiment, view 400 displays obstacles (e.g., other vehicles) 402-403 immediately to a left, to a right, to a front, and/or to a back of vehicle 102. The obstacles can be obstacles captured by one or more image capturing devices for vehicle 102. The image capturing devices of vehicle 102 can be any types of image capturing devices (e.g., color, monochrome, infra-red, RADAR, LIDAR, Time-of-Flight cameras) mounted on vehicle 102 (not shown) to detect a surrounding environment of vehicle 102. The image capturing devices can capture information of obstacles and depth information of the obstacles for a surrounding of vehicle 102. For another embodiment, the obstacles may be part of a map information that is previously loaded onto vehicle 102 or streamed to vehicle 102 by vehicle server 150 of FIG. 1 in real-time. Some obstacle information can include point of interests (statues), road blocks, traffic islands, tunnels information, etc.

Figure 7:

For one embodiment, upon determining that vehicle 102 is in motion (e.g., speeds up from a standstill), a display for vehicle 102 may (gradually or abruptly) transition or shift from an overhead, such as view 400 of FIG. 4, to a third-person view, such as view 700 of FIG. 7. For a gradual transition, view 400 of FIG. 4 may transition to view 500 of FIG. 5, view 600 of FIG. 6, then view 700 of FIG. 7.

Referring to FIG. 7, third-person view 700 can include driving statistics similar to view 400 of FIG. 4. Third-person view 700 can simulate a view not directly overhead but above and behind vehicle 102. This way, the third-person view can include obstacles to a left, to a right, and/or an extended distance to the front of vehicle 102 to enhance safety.

For one embodiment, upon determining that vehicle 102 is coming to a standstill (e.g., slowing down to a stop), a display may (gradually or abruptly) transition or shift from a third-person view, such as view 700 of FIG. 7, to an overhead view, such as view 400 of FIG. 4. For a gradual transition, view 700 of FIG. 7 may transition to view 600 of FIG. 6, view 500 of FIG. 5, then view 400 of FIG. 4. For other embodiments, a display can transition between a drone view, a first-person view, an overhead view, and/or a third-person view, in any combination or order upon satisfying some predetermined conditions. For example, a display can display an overhead view conditioned upon the vehicle being in a standstill, a third-person view conditioned upon a first speed range, a first-person (perspective) view conditioned upon a second speed range, and a drone view conditioned upon a third speed range for vehicle 102. For one embodiment, a view transition for one display area can be different than a view transition for another display area of vehicle 102.

Figure 8:
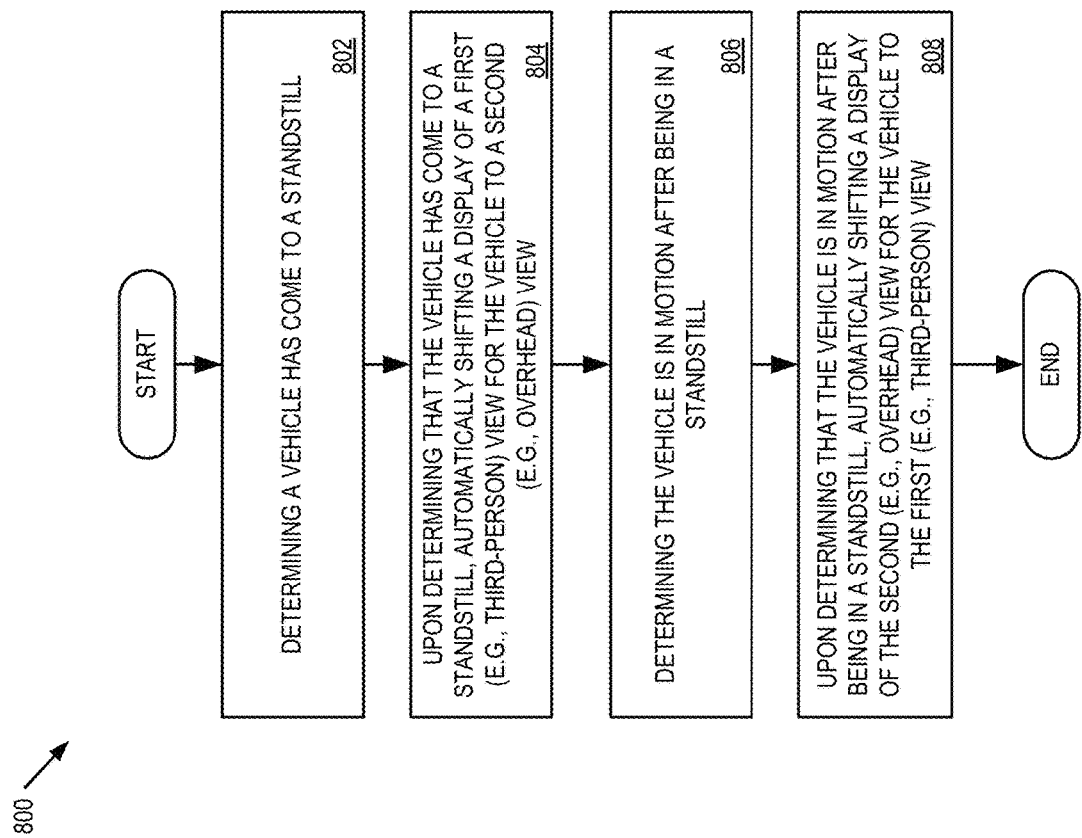
FIG. 8 is a flow diagram of one embodiment for shifting a display of a road view for a vehicle.

FIG. 8 is a flow diagram of one embodiment for shifting a display of a road view for a vehicle. Method 800 can be performed by processing logic that may comprise hardware (circuitry, dedicated logic, etc.), software (such as is run on a general purpose computer system or a dedicated machine), firmware, or a combination. For one embodiment, method 800 is performed by display system 103 of motor vehicle 102.

Referring to FIG. 8, at processing block 802, processing logic determines a vehicle has come to a standstill. At processing block 804, upon determining that the vehicle has come to a standstill, processing logic automatically shifts a display of a first (such as a third-person) view for the vehicle to a second (such as an overhead) view. At processing block 806, processing logic determines the vehicle is in motion after being in a standstill. At processing block 808, upon determining that the vehicle is in motion after being in a standstill, processing logic automatically shifts a display of the second view for the vehicle to the first view.

For one embodiment, processing logic further captures one or more images for a surrounding environment of the vehicle, where the one or more images is captured by one or more image capturing devices of the vehicle.

For one embodiment, the one or more images includes depth information to determine a distance of obstacles surrounding the vehicle to the vehicle. For one embodiment, the one or more images comprises: red-green-blue (RGB), monochrome, RADAR, LIDAR images, or time-of-flight images.

For one embodiment, where automatically shifting a display of a second (overhead) view for the vehicle to a first (third-person) view includes generating the first (third-person) view for the vehicle, where the first (third-person) view includes obstacle information for obstacles in the first (third-person) view for the vehicle; and displaying the first (third-person) view on a display near a dash of the vehicle.

For one embodiment, where automatically shifting a display of a first (third-person) view for the vehicle to a second (overhead) view includes generating the second (overhead) view for the vehicle, where the second (overhead) view includes obstacle information for obstacles in the second (overhead) view for the vehicle; and displaying the second (overhead) view on a display near a dash of the vehicle.

For one embodiment, both the third-person view and the overhead view display driving statistics for the vehicle. For one embodiment, the driving statistics comprise a speed, a fuel/battery capacity, a distance range, and an energy output of the vehicle. For one embodiment, the first view includes a third-person view viewing from a position above and behind the vehicle. For one embodiment, the second view includes an overhead view approximately directly above the vehicle.

The embodiments as will be hereinafter described may be implemented through the execution of instructions, for example as stored in memory or other element, by processor(s) and/or other circuitry of motor vehicle 102. Particularly, circuitry of motor vehicle 102, including but not limited to processor(s) 212 may operate under the control of a program, routine, or the execution of instructions to execute methods or processes in accordance with the aspects and features described herein. For example, such a program may be implemented in firmware or software (e.g. stored in memory 205) and may be implemented by processors, such as processor(s) 212, and/or other circuitry. Further, the terms processor, microprocessor, circuitry, controller, etc., may refer to any type of logic or circuitry capable of executing logic, commands, instructions, software, firmware, functionality and the like.

Further, some or all of the functions, engines, or modules described herein may be performed by motor vehicle 102 itself and/or some or all of the functions, engines or modules described herein may be performed by another system connected through network interface 204 to motor vehicle 102. Thus, some and/or all of the functions may be performed by another system, and the results or intermediate calculations may be transferred back to motor vehicle 102.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in various ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable one to make or use the methods, systems, and apparatus of the present disclosure. Various modifications to these embodiments will be readily apparent, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method to shift a view of a display of a vehicle, the method comprising:
   determining a vehicle has come to a standstill;
   upon determining that the vehicle has come to a standstill, automatically shifting a display of a first view for the vehicle to a second view, wherein the second view is an overhead view that includes a top view of the vehicle;
   determining the vehicle is in motion after being in a standstill; and
   upon determining that the vehicle is in motion after being in a standstill, automatically shifting a display of the second view for the vehicle to the first view, wherein the first view includes a viewing position above and behind the vehicle.

2. The method of claim 1, further comprising capturing one or more images for a surrounding environment of the vehicle, wherein the one or more images is captured by one or more image capturing devices of the vehicle.

3. The method of claim 2, wherein the one or more images includes depth information to determine a distance of obstacles surrounding the vehicle to the vehicle.

4. The method of claim 2, wherein the one or more images comprises: red-green-blue (RGB), monochrome, RADAR, or LIDAR images.

5. The method of claim 1, wherein automatically shifting a display of a second view for the vehicle to a first view comprises:
   generating the first view for the vehicle, wherein the first view includes obstacle information for obstacles in the first view for the vehicle; and
   displaying the first view on a display near a dash of the vehicle.

6. The method of claim 5, wherein obstacles in the first view for the vehicle include obstacles immediately to a left, to a right, to a front, and to a back of the vehicle.

7. The method of claim 1, wherein automatically shifting a display of a first view for the vehicle to a second view comprises:
   generating the second view for the vehicle, wherein the second view includes obstacle information for obstacles in the second view for the vehicle; and
   displaying the second view on a dash display of the vehicle.

8. The method of claim 7, wherein obstacles in the second view for the vehicle include obstacles to a left, to a right, and to a predetermined distance extended to a front of vehicle.

9. The method of claim 1, wherein both the first view and the second view display driving statistics for the vehicle.

10. The method of claim 1, wherein the driving statistics comprise a speed, a fuel/battery capacity, a distance range, and an energy output of the vehicle.

11. The method of claim 1, wherein the first view or the second view for the vehicle displays a driving mode, an indicator for fuel/battery capacity, an indicator for battery range, a speed indicator, an energy output indicator, a cellular network status indicator, and outdoor temperature for vehicle.

12. A non-transitory machine-readable medium having instructions stored therein, which when executed by a processor, cause the processor to perform operations, the operations comprising:
   determining a vehicle has come to a standstill;
   upon determining that the vehicle has come to a standstill, automatically shifting a display of a first view for the vehicle to a second view, wherein the second view is an overhead view that includes a top view of the vehicle;
   determining the vehicle is in motion after being in a standstill; and
   upon determining that the vehicle is in motion after being in a standstill, automatically shifting a display of the second view for the vehicle to the first view, wherein the first view includes a viewing position above and behind the vehicle.

13. The non-transitory machine-readable medium of claim 12, wherein the operations further comprise capturing one or more images for a surrounding environment of the vehicle, wherein the one or more images is captured by one or more image capturing devices of the vehicle.

14. The non-transitory machine-readable medium of claim 13, wherein the one or more images includes depth information to determine a distance of obstacles surrounding the vehicle to the vehicle.

15. The non-transitory machine-readable medium of claim 13, wherein the one or more images comprises: red-green-blue (RGB), monochrome, RADAR, or LIDAR images.

16. The non-transitory machine-readable medium of claim 12, wherein automatically shifting a display of a second view for the vehicle to a first view comprises:
   generating a first view for the vehicle, wherein the first view includes obstacle information for obstacles in the first view for the vehicle; and
   displaying the first view on a display near a dash of the vehicle.

17. A data processing system, comprising:
   a processor; and
   a memory coupled to the processor to store instructions, which when executed by the processor, cause the processor to perform operations, the operations including:
   determining a vehicle has come to a standstill;
   upon determining that the vehicle has come to a standstill, automatically shifting a display of a first view for the vehicle to a second view, wherein the second view is an overhead view that includes a top view of the vehicle;
   determining the vehicle is in motion after being in a standstill; and
   upon determining that the vehicle is in motion after being in a standstill, automatically shifting a display of the second view for the vehicle to the first view, wherein the first view includes a viewing position above and behind the vehicle.

18. The system of claim 17, wherein the operations further comprise capturing one or more images for a surrounding environment of the vehicle, wherein the one or more images is captured by one or more image capturing devices of the vehicle.

19. The system of claim 18, wherein the one or more images includes depth information to determine a distance of obstacles surrounding the vehicle to the vehicle.

20. The system of claim 18, wherein the one or more images comprises: red-green-blue (RGB), monochrome, RADAR, or LIDAR images.

21. The system of claim 18, wherein automatically shifting a display of a second view for the vehicle to a first view comprises:
   generating a first view for the vehicle, wherein the first view includes obstacle information for obstacles in the first view for the vehicle; and
   displaying the first view on a display near a dash of the vehicle.

22. A method to shift a view of a display of a vehicle, the method comprising:
   determining a vehicle is slowing down;
   upon determining that the vehicle is slowing down, gradually shifting a display of a first view for the vehicle to a second view through one or more intermediate views, wherein the second view is an overhead view that includes a top view of the vehicle;
   determining the vehicle is speeding up; and
   upon determining that the vehicle is speeding up, gradually shifting a display of the second view for the vehicle to the first view through the one or more intermediate views, wherein the first view includes a viewing position above and behind the vehicle.

23. The method of claim 22, wherein when the vehicle comes to a complete stop, the overhead view for the vehicle is displayed on a display of the vehicle.

24. A data processing system, comprising:
   a processor; and
   a memory coupled to the processor to store instructions, which when executed by the processor, cause the processor to perform operations, the operations including:
   determining a vehicle is slowing down;
   upon determining that the vehicle is slowing down, gradually shifting a display of a first view for the vehicle to a second view through one or more intermediate views, wherein the second view is an overhead view that includes a top view of the vehicle;
   determining the vehicle is speeding up; and
   upon determining that the vehicle is speeding up, gradually shifting a display of the second view for the vehicle to the first view through the one or more intermediate views, wherein the first view includes viewing position above and behind the vehicle.

25. The system of claim 24, wherein the operations further comprise capturing one or more images for a surrounding environment of the vehicle, wherein the one or more images is captured by one or more image capturing devices of the vehicle.

* * * * *